United States Patent Office 3,205,293
Patented Sept. 7, 1965

3,205,293
INSTRUCTIONAL DEVICE FOR SIMULATED CODED TARGET IDENTIFICATION SIGNALS
Joseph J. Zyskowski, Rockaway, N.J., assignor, by mesne assignments, to the United States of America as represented by the Secretary of the Navy
Filed July 13, 1962, Ser. No. 209,806
12 Claims. (Cl. 35—10.4)
(Granted under Title 35, U.S. Code (1952), sec. 266)

The invention described herein may be manufactured and used by or for the Government for governmental purposes without the payment of any royalty thereon.

This invention relates to electronic simulator apparatus and is particularly directed towards a device for generating IFF (identificational, friend or foe) signals. In navigation today, apparatus is installed on mobile aircraft which automatically identifies the mobile aircraft to the radio detecting ranging equipment which has detected its presence. It is desirable to train personnel in the use of such IFF equipment without the use of the operational equipment.

It is therefore an object of the present invention to provide a novel apparatus for simulating these IFF signals generated by mobile aircraft.

A further object of the instant invention is to provide a novel apparatus for simultaneously simulating the IFF signals generated by six different mobile targets.

Other objects and many of the attendant advantages of this invention will be readily appreciated as the same becomes better understood by reference to the following detailed description when considered in connection with the accompanying drawings wherein.

Figure 1:
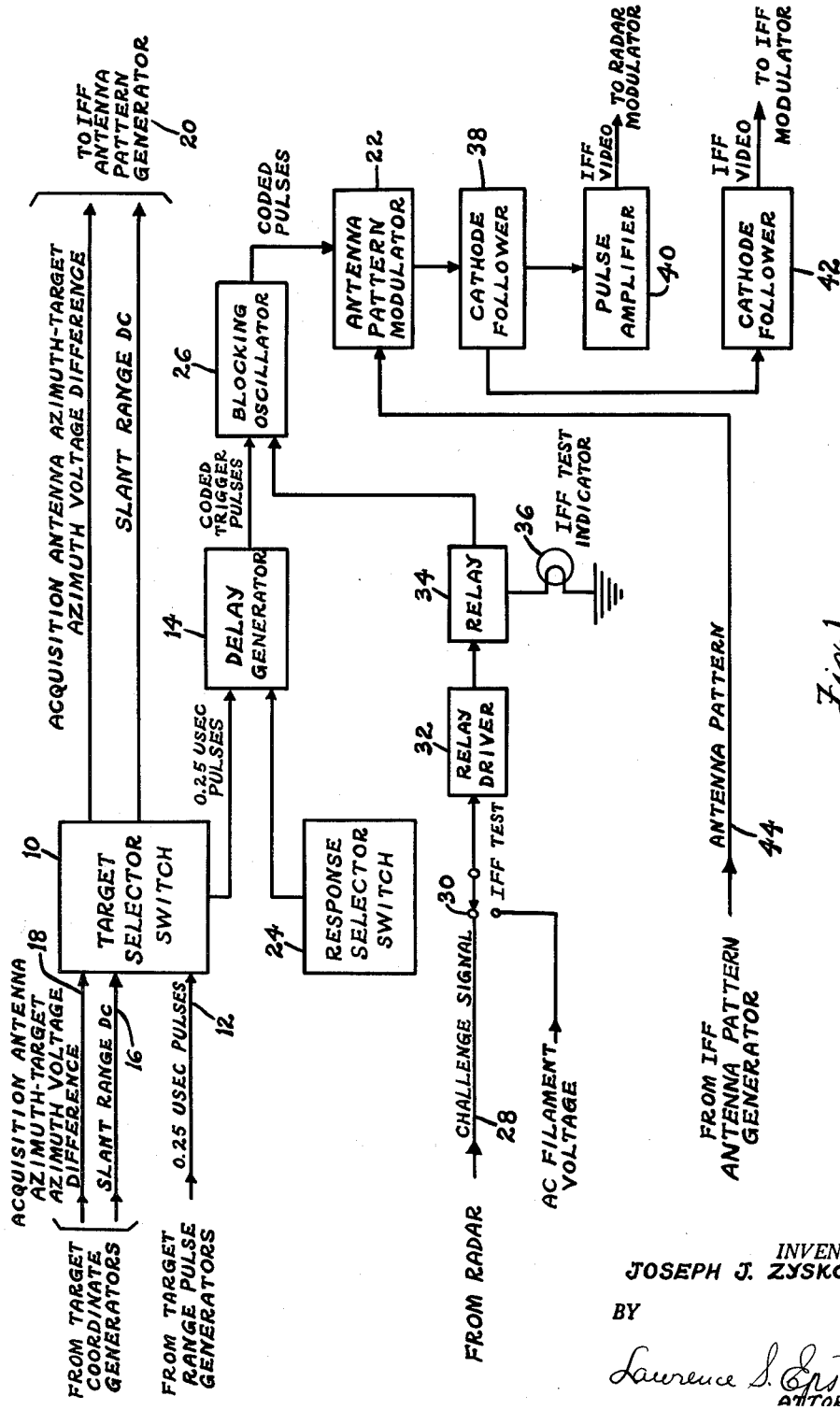
FIG. 1 is a block diagram of the IFF simulator.

Referring now to FIG. 1, the function of the IFF simulator is to form coded identificational signals that are fed to a radar set which is used in conjunction with the simulator. The IFF simulator is capable of generating IFF responses from any one of six simulated air targets at a given time. The IFF response may be in one of five codes as given below:

*Tactical Code 1.*—Transponder delay followed by a one-microsecond pulse.

*Tactical Code 2.*—Transponder delay followed by two-microsecond pulses spaced 16 microseconds apart.

*Tactical Code 3.*—Transponder delay, followed by four one-microsecond pulses spaced 16 microseconds apart.

A bogus code which is four one-microsecond pulses as in Tactical Code 3 with random spacing.

A spoof code which is four one-microsecond pulses as in Tactical Code 3 but with eight-microsecond spacing.

The airborne target which emanates IFF response is determined by the target selector switch 10. This is accomplished by switching 0.25 microsecond pulses 12 from a target range pulse generator to the first delay generator 14 while simultaneously switching slant range D.C. 16 and acquisition antenna azimuth-target, azimuth-voltage difference 18 from a respective target coordinate generator to the IFF antenna pattern generator 20. The resultant IFF antenna pattern voltage returned to the IFF generator and applied to the antenna pattern modulator 22 limits IFF response to times when the azimuth of the acquisition radar antenna is within a few degrees of the simulated target azimuth. A second switch, response selector switch 24, determines the code of the IFF response by changing RC combinations in the delay generator multivibrator circuits 14. Coded trigger pulses from the delay generators trigger the blocking oscillator circuits 26 which operates only when a challenge signal 28 from the radar, or an IFF test signal is applied through the IFF test switch 30. The presence of either of these two signals causes conduction in relay driver 32 to energize relay 34.

The relay when energized removes bias from the trigger tube of the blocking oscillator circuits 26 and energizes the IFF test indicator 36. Coded pulses from the blocking oscillator circuits 26 are fed through the cathode follower circuits 38 to the pulse amplifier 40 and the cathode follower 42 provided an antenna pattern voltage 44 is fed to the antenna pattern modulator 22. Coded pulses from the pulse amplifier 40 constitute IFF video which is fed to the IFF input of the operational radar. Coded pulses from the cathode follower 42 are fed to the IFF modulator of the simulation device for mixing with acquisition video before application to the device PPI monitor. At the time of target kill, IFF response from the killed target is discontinued since 0.25 microsecond target pulses are not fed to the IFF generator from a respective target range pulse generator.

The manner in which the IFF codes are generated is given in the following description. In addition, circuit descriptions of the relay driver and the blocking oscillator trigger tube are also given.

Figure 2:
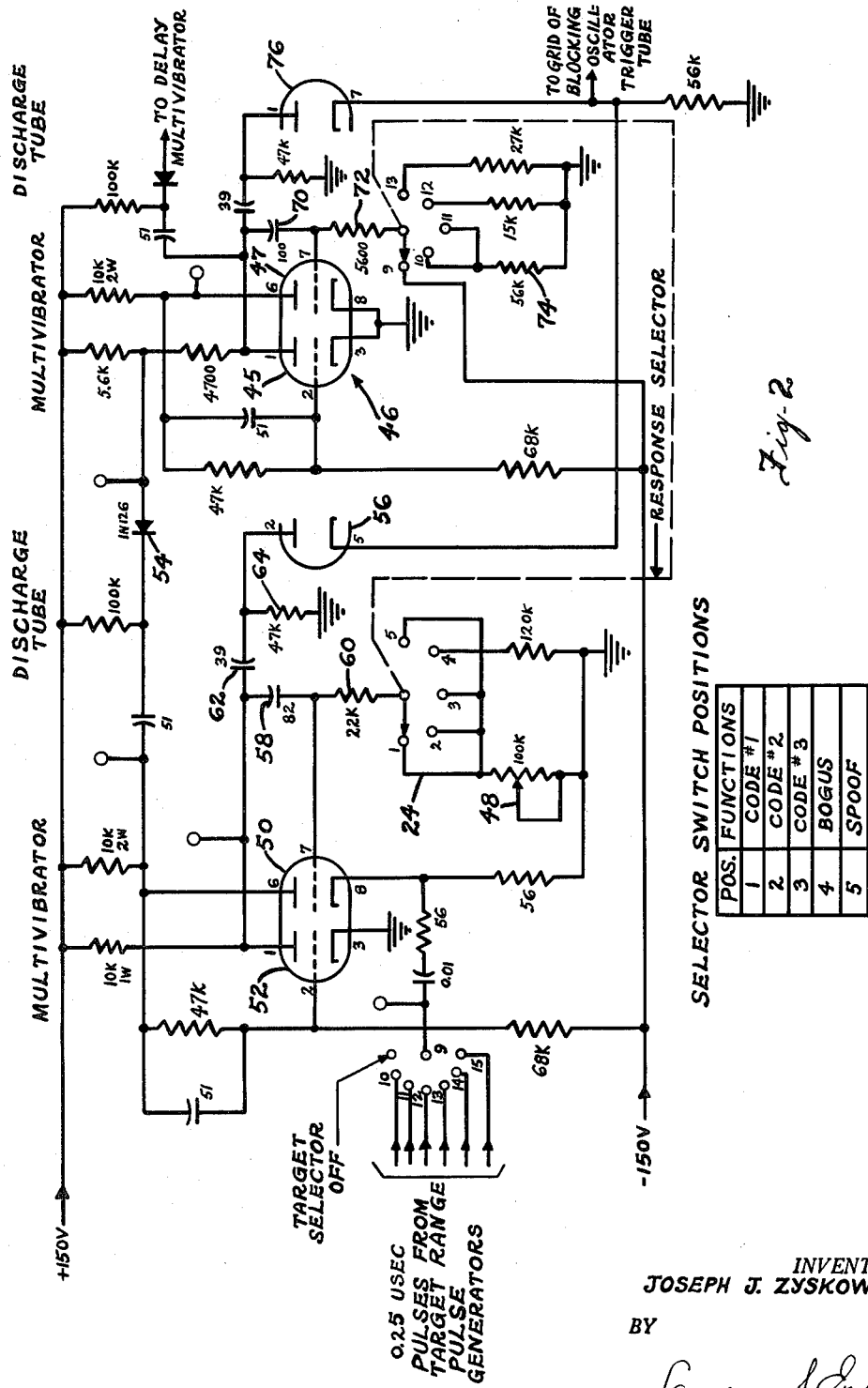
FIG. 2 is a simplified schematic diagram of the delay generators utilized in the IFF simulator.

Referring now to FIG. 2 which shows the circuit of the two delay generators that produce Tactical Codes Nos. 1 and 2. The circuit description of these two generators is given to indicate the manner in which IFF response is initiated by 0.25 microsecond target pulses from a respective target pulse range pulse generator and to indicate how the spacing of IFF response pulses is determined by the selector switch 24. Tactical Code No. 1 is generated when the response selector switch 24 is in the number one position. There are three delay multivibrators 46 in the delay generator. Due to the fact that all the delay multivibrators operate in the same manner, only the one shown in FIG 2 will be described. The three delay multivibrators are made inoperative by a negative 150 volts applied to a respective grid of each of these stages by operation of response selector switch 24. The transponder delay which is the time that a one-microsecond pulse occurs after the application of a 0.25 microsecond pulse through the target selector switch 24, is dependent on the adjustment of potentiometer 48 in the grid circuits of tube 50. This is accomplished by having tube 50 conducting and tube 52 cutoff in the quiescent state. The application of a positive 0.25 microsecond pulse to the cathode of the tube 50 from the response selector switch 24 in position one, cuts this section off so that a positive step voltage appears at the plate of tube 50. This rise in plate voltage is applied to the grid of tube 52 and a negative step voltage is produced at the plate of this tube. However, crystal rectifier 54 and tube 56 are so connected to the plate of tube 52 that these do not conduct unless a negative step voltage appears at the plate of tube 50 and a positive step voltage at the plate of tube 52. This occurs at a time that the one-shot multivibrator comprising tubes 50 and 52 returns to its original state as determined by the time constant of capacitor 58 and the series resistor combination 60 and 48.

Figure 3:
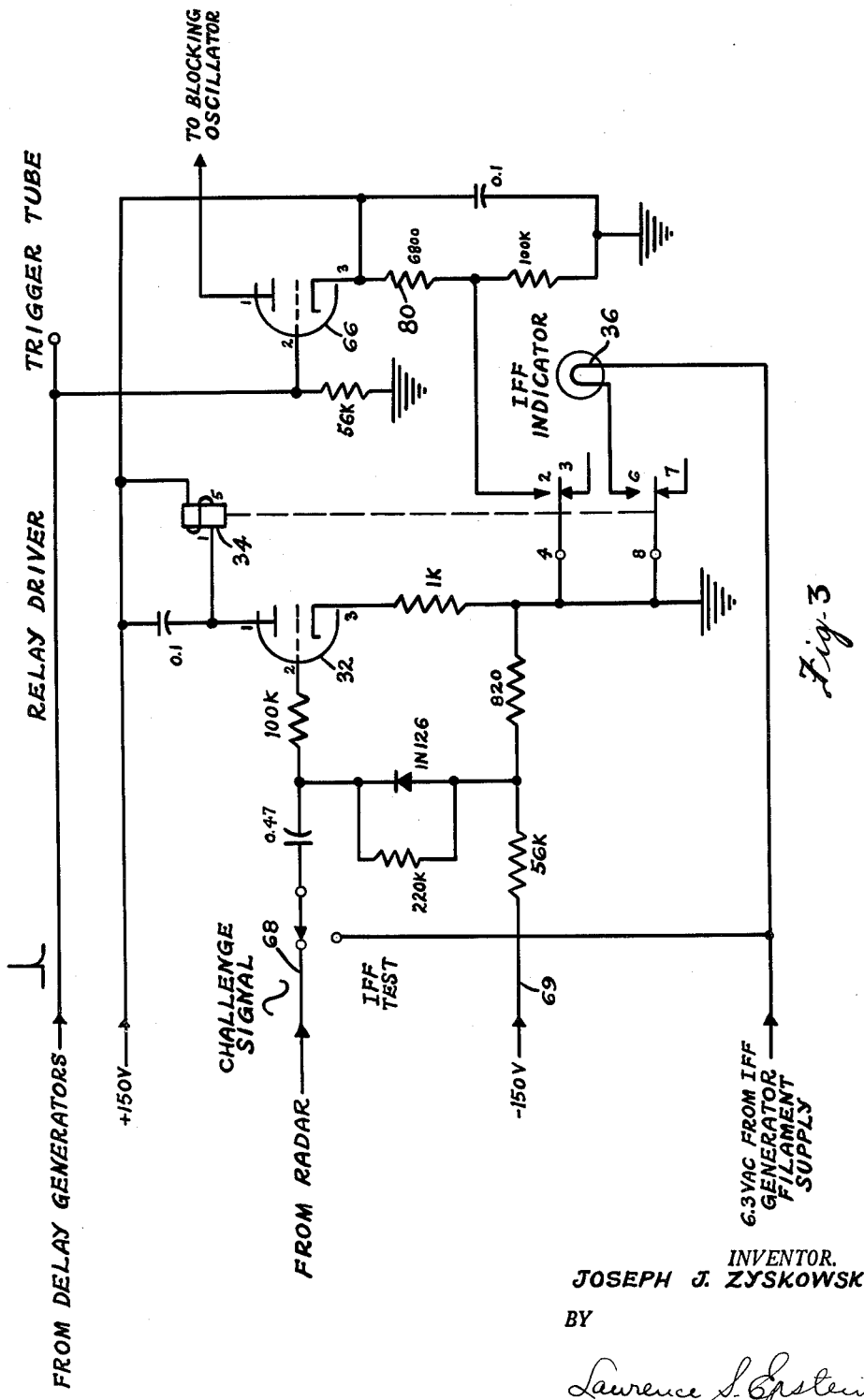
FIG. 3 is a simplified schematic diagram of the relay driver and trigger tube circuitry.

Return time of the one-shot multivibrator, comprising tubes 50 and 52, to its original state can be varied by changing the resistance of potentiometer 48. The positive step at the plate of tube 52 is differentiated by the resistance capacitor combination 62 and 64 respectively, and with capacitor 62 charging through tube 56 causing a fast rise in potential at the grid of trigger tube 66 which is shown in FIG. 3. Conduction results in tube 66 only if a challenging signal 65 or test signal 69 is also present. When trigger tube 66 conducts the usual blocking oscillator action by blocking oscillator 26 takes place. If an antenna pattern voltage is present, the output pulse from the blocking oscillator circuits feed cathode follower 38 which in turn feeds cathode follower 42 and pulse amplifier 40.

When the response selector switch 24 is turned to position number 2 the grid of multivibrator tube 47 is returned to ground so that the one-shot delay multivibrator comprising tubes 45 and 47 becomes operative. The required negative step voltage appearing at the plate of tube 50 is fed through crystal rectifier 54 to trigger the one-shot multivibrator 46. The action of the multivibrator 46 is the same as the action of the multivibrator comprising tubes 50 and 52 in that a delay is caused by the time constant of capacitor 70 in combination with resistors 72 and 74 in the grid circuit of tube 47 before a positive pulse voltage is produced at the plate of tube 47. The grid circuit RC time constant of tube 47 is such that a 16-microsecond delay occurs. At the end of this time, the positive step on tube 45 causes conduction in tube 76 and trigger tube 66. Thus, if a challenge signal 68 or an IFF test signal is present, a 0.25 microsecond pulse applied to multivibrator tubes 50 and 52 when the response selector 24 is in the number two position, causes an IFF response consisting of a delay, a 1.0-microsecond pulse, a 16-microsecond delay and a second 1.0-microsecond pulse. It is again assumed that an antenna pattern voltage is present.

Trigger tube 66 used to trigger blocking oscillator tube 26 is cut off in the quiescent state by returning its cathode to the positive 150-volt supply. The high negative bias on the grid of tube 66 is reduced when relay 34 is energized by conduction in relay driver tube 32. This tube is driven into conduction by a challenge signal 68 from the radar or by depressing the IFF test switch 30. Filament voltage 69 serves as a simulated challenge signal. When relay 34 is energized, IFF indicator lamp 36 is also energized. Although the bias on trigger tube 66 is reduced when relay 34 is energized, a bias sufficient to keep this tube a low cutoff is developed by resistor 80. However, the fast trigger pulse from respective delay generators previously described above drives the trigger tube 66 into conduction. Therefore, to obtain coded IFF response for antenna pattern modulation within the IFF generator, 0.25-microsecond pulses from a respective target range generator and a challenge signal from the radar or test A.-C. signal are required.

The overall simulator device contains structure and mechanism for covering acquisition track and killing phases of air defense problems to be solved by a training radar crew operating a respective air defense fire distribution system in conjunction with a device as programmed by the instructor. Simulated airborne target flight paths are generated as a result of manual inputs to target coordinate generators by the device operator. Necessary data for manual inputs is obtained, and a Nike missile trajectory is automatically generated from tracking data supplied by the Nike fire distribution system. A simulated target is first acquired by the manipulation of the appropriate radar set controls by the training crews at the radar site. Upon the acquisition of a simulated airborne target the instructor may require the trainee crew to request an IFF response from an acquired airborne target. When an IFF channel signal is received from the operational radar, the device automatically supplies the operational radar a coded IFF response. The code is selected by the device operator by means of an appropriate control on the operator's console. The trainee crew evaluates simulated IFF response and designates the target according to IFF response received. If the response indicates a hostile airborne target, the operational radar is switched from acquisition to track by means of appropriate controls on the operational radar set.

Obviously many modifications and variations of the present invention are possible in the light of the above teachings. It is therefore to be understood that within the scope of the appended claims the invention may be practiced otherwise than as specifically described.

What is claimed is:

1. An instructional device for simulated coded target identification signals, when supplied with a signal representing a simulated challenge signal, comprising:
   means for producing coded target identification pulses, including
      signal generating means,
      a source of pulses, connected to said signal generating means for control thereof, and
      delay means, connected between said source of pulses and said signal generating means, whereby said source of pulses control the operation of said signal generating means, to form coded pulses in accordance with said pulses from said source of pulses;
   modulation means, connected to said signal generating means;
   pulse amplifier means and cathode follower output means connected to said modulation means;
   relay driver means, being energized by said challenge signal; and
   relay means, coupled to said relay driver means and said signal generating means for controlling the ON and OFF time of said signal generating means in accordance with the presence and absence of said challenge signal.

2. The combination of claim 1 and target selector switch means operatively connected between said source of input pulses and said delay means whereby said switch means controls the coding of said input pulse means thereby controlling the output coded target identification signal in accordance with the selected target.

3. The combination of claim 2 wherein said delay means comprise one or more monostable multivibrators and a resistor-capacitor combination, said resistor-capacitor combination being operatively connected to the grid and plate timing points of said multivibrators whereby the input pulses are delayed by a time determined by the resistor-capacitor combination.

4. The combination of claim 3 and a source of antenna pattern signals operatively connected to said modulating means whereby actual radar returns are simulated.

5. The combination of claim 4 wherein said modulating means comprise crystal rectifiers.

6. The combination of claim 5 and a source of acquisition antenna azimuth-target azimuth voltage difference and a source of slant range D.C. signals, both signals operatively connected to said target selector switch.

7. The combination of claim 6 wherein said target coded pulses comprise Tactical Code 1 corresponding to transponder delay followed by a one-microsecond pulse.

8. The combination of claim 7 wherein said target output code corresponds to Tactical Code 2 corresponding to transponder delay followed by two one-microsecond pulses spaced 16-microseconds apart.

9. The combination of claim 8 wherein said target output code comprises Tactical Code 2 corresponding to transponder delay followed by four one-microseconds spaced 16-microseconds apart.

10. The combination of claim 9 wherein said target identification output code comprises the bogus code which consists of four one-microsecond pulses with random spacing.

11. The combination of claim 10 wherein said target output code comprises a spoof code which consists of four one-microsecond pulses with eight-microsecond spacing.

12. The combination of claim 11 wherein said delay means comprises a delay generator comprising a first monostable multivibrator, a first discharge tube, a second multivibrator and a second discharge tube, said first multivibrator being connected to said first discharge tube and also being connected to said second multivibrator, said second multivibrator being connected to said second discharge tube, said first and second multivibrators being controlled by said target position selector switch to provide variable delayed output pulses.

References Cited in the file of this patent

UNITED STATES PATENTS

| | | | |
|---|---|---|---|
| 2,901,742 | 8/59 | Burnight et al. | 343—6.8 X |
| 2,922,157 | 1/60 | McShan | 343—17.7 |
| 2,938,202 | 5/60 | Kirch et al. | 343—6.8 X |

CHESTER L. JUSTUS, *Primary Examiner*.

MAYNARD R. WILBUR, *Examiner*.